(12) United States Patent
Feuerecker et al.

(10) Patent No.: US 7,530,390 B2
(45) Date of Patent: May 12, 2009

(54) AIR CONDITIONER FOR A MOTOR VEHICLE

(75) Inventors: Günther Feuerecker, Stuttgart (DE); Andreas Kemle, Bietigheim-Bissingen (DE)

(73) Assignee: BEHR GmbH & Co. KG, Stuttgart (DE)

( * ) Notice: Subject to any disclaimer, the term of this patent is extended or adjusted under 35 U.S.C. 154(b) by 776 days.

(21) Appl. No.: 10/517,054

(22) PCT Filed: Jun. 2, 2003

(86) PCT No.: PCT/EP03/05751

§ 371 (c)(1),
(2), (4) Date: Dec. 3, 2004

(87) PCT Pub. No.: WO03/104000

PCT Pub. Date: Dec. 18, 2003

(65) Prior Publication Data

US 2005/0224221 A1    Oct. 13, 2005

(30) Foreign Application Priority Data

Jun. 6, 2002    (DE) ................................ 102 25 055

(51) Int. Cl.
*B60H 1/00* (2006.01)
*F25B 29/00* (2006.01)
(52) U.S. Cl. .................... 165/202; 165/42; 165/43; 165/240; 62/238.6; 62/238.7; 62/160; 62/323.1; 62/324.4; 62/244; 62/196.4; 237/2 B; 237/12.3 B

(58) Field of Classification Search ................. 165/202, 165/203, 204, 42, 43, 240, 241, 242; 62/160, 62/323.1, 324.4, 244, 239, 238.6, 238.7, 62/196.4; 237/2 B, 12.3 B
See application file for complete search history.

(56) References Cited

U.S. PATENT DOCUMENTS

| 3,738,119 | A | * | 6/1973 | Scherer et al. ................. 62/217 |
| 4,616,484 | A | * | 10/1986 | Mehdi et al. ................... 62/180 |
| 5,419,149 | A | * | 5/1995 | Hara et al. ..................... 62/160 |
| 5,497,941 | A |   | 3/1996 | Numazawa et al. |
| 5,694,780 | A | * | 12/1997 | Alsenz ........................ 62/117 |
| 5,740,681 | A |   | 4/1998 | Karl |
| 6,041,849 | A |   | 3/2000 | Karl |

FOREIGN PATENT DOCUMENTS

| DE | 36 35 353 A1 | 4/1988 |
| DE | 37 01 086 A1 | 4/1988 |
| DE | 39 07 201 A1 | 9/1990 |
| DE | 196 44 583 A1 | 4/1998 |
| EP | 1 295 739 A1 | 3/2002 |

* cited by examiner

*Primary Examiner*—John K Ford
(74) *Attorney, Agent, or Firm*—Foley & Lardner LLP

(57) ABSTRACT

The invention relates to an air conditioner for a motor vehicle, comprising a coolant circuit (1) that is provided with several heat-transferring devices through which a coolant can be directed, a heat-transferring device (12) also being part of a coolant circuit. Coolant is redirected from portions of the coolant circuit (1), which are shut down during heating, into a portion of the coolant circuit (1), which is active during heating, as required. Also disclosed is a method for operating such an air conditioner.

20 Claims, 3 Drawing Sheets

AIR CONDITIONER FOR A MOTOR VEHICLE

BACKGROUND

The invention relates to an air-conditioning system for a motor vehicle.

Particularly in low-consumption vehicles, there is often a lack of heating power available for heating purposes when driving off on cold days, and consequently it is necessary to employ additional heating measures. To reduce the energy consumption of motor vehicles and to save energy, heat pump systems are used in air-conditioning systems of low-consumption vehicles. Many heat pumps use the ambient air as heat source. Since in this case ambient heat is rendered usable for heating purposes, systems of this type may have an advantageous energy consumption. As the outside temperatures drop, so does the supply of heat to a heat pump of this type. This runs contrary to the additional heating demand, which rises as the ambient temperature drops, and consequently heat pump systems of this type soon reach the limits of their use at which they are no longer able to cover the demand for power. Further problems, such as for example frosting or icing of the heat exchanger which extracts heat from the ambient air, require additional measures to be used.

Many heat pumps additionally use the evaporator which cools the passenger compartment feed air in cooling mode as a heater which heats the passenger compartment feed air in heating mode. However, this has the drawback that condensation precipitates at the evaporator/heater during cooling and dehumidification. If this wet evaporator is used for heating, flash fogging of the windows occurs, which must be avoided at all costs for safety reasons. This type of sequence, in which heating and cooling closely follow one another in terms of time often occurs in the transitional seasons of the year in spring and fall.

Only the addition of a further heat exchanger in the feed air stream which is used only for heating purposes, whereas the evaporator is used exclusively for cooling and dehumidification purposes, provides a reliable remedy to this problem without any limitation, as described, for example, in DE 39 07 201.

If the engine cooling water which is heated by the engine waste heat is used as heat source, the system is not so dependent on the ambient conditions, since the engine cooling water heats up quickly over the course of time and consequently a productive and powerful heat source is provided for the heat pump. This is disclosed, for example, in DE 36 35 353.

In DE 196 44 583 A1, it is on the one hand proposed that the engine waste heat be used as heat source (for example including the engine cooling water), and on the other hand that the heat be transferred to the passenger compartment feed air by means of a dedicated heat exchanger. A system of this type includes at least four heat exchangers:

1. a heat exchanger which in cooling mode dissipates the waste heat from the cycle process to the environment (in conventional systems with a condensing working medium, this is referred to as a condenser, whereas in $CO_2$ systems operated under supercritical conditions it is referred to as a gas cooler),
2. an evaporator which in cooling mode cools and dehumidifies the passenger compartment feed air,
3. a heat exchanger which heats the passenger compartment feed air in heating mode (heater), and
4. a heat exchanger which in heating mode takes up engine waste heat (heat pump evaporator).

In the case of the supercritical $CO_2$ process, there is also an inner heat exchanger, which exchanges heat between the high-pressure side and low-pressure side, in order to increase the performance and efficiency.

Therefore, in both heating mode and cooling mode, two heat exchangers are operating, while the other two are inoperative. This can give rise to very different demands for refrigerant in the two operating states. In the heating mode, the refrigerant in the inoperative components which are in communication with the cold ambient air can completely condense, and consequently the highest demand for refrigerant is during heating mode. Completely blocking off the inoperative branches is unable to reliably suppress the displacement of refrigerant, since considerable quantities of refrigerant can still enter these inoperative parts of the refrigerant cycle through slight leaks at the valves or as a result of unfavorable conditions when switching over between the modes. This displacement of refrigerant can in principle be effected by holding in stock a sufficient quantity of refrigerant and buffering this quantity of refrigerant by means of a sufficiently large collector. However, this should be avoided for reasons of the space taken up and also for safety reasons in particular when using the toxic refrigerant carbon dioxide.

It is an object of the invention to avoid the abovementioned drawbacks and to provide an improved refrigerant circuit.

SUMMARY

According to the invention, recirculation of refrigerant from parts of the refrigerant circuit which are not required in the heating mode into parts of the refrigerant circuit which are active in the heating mode is provided on demand in the refrigerant circuit of the air-conditioning system. It is in this way possible to manage the displacement of refrigerant into the inoperative parts of the refrigerant circuit. There is no need to store large quantities of refrigerant to compensate for the loss of refrigerant into the inoperative parts of the refrigerant circuit.

The suction pressures which rise with the temperature of the engine coolant during operation constitute an obstacle to the recirculation of refrigerant, meaning that the inoperative parts of the refrigerant circuit cannot be sucked completely empty by being connected to the suction side of the compressor. This difficulty is preferably resolved by it being possible to disconnect the heat pump evaporator from the inflow of the coolant which represents the heat source. When the heat pump evaporator is disconnected from the coolant circuit, which is preferably an engine coolant circuit, the heat pump evaporator cools down, and as a result the suction pressure drops. When the suction pressure is lower than the vapor pressure, which is determined by the ambient temperature, in the inoperative parts of the refrigerant circuit, refrigerant can flow out of these inoperative parts into the active part of the refrigerant circuit and can therefore be recirculated into the refrigerant circuit.

It is preferable for there to be means for determining a demand for refrigerant, in particular means for determining whether there is sufficient refrigerant in that part of the refrigerant circuit through which refrigerant is flowing in the heating mode, these means monitoring the state of the refrigerant. The means are preferably at least one temperature or pressure sensor.

The temperature sensor is preferably arranged downstream of the compressor and upstream of a heater, as seen in the direction of flow of the refrigerant, in the refrigerant circuit.

The pressure sensor is preferably arranged upstream of the compressor, as seen in the direction of flow of the refrigerant, in the refrigerant circuit.

In addition, the following parameters "coolant temperature at the heat pump evaporator", "refrigerant temperature upstream of the heat pump evaporator", "refrigerant temperature downstream of the heat pump evaporator", "compressor rotational speed", "air temperatures in the air-conditioning unit", "high pressure" and/or "suction pressure" can also be evaluated for monitoring purposes.

It is preferable for a nonreturn valve to be provided in the refrigerant circuit, which nonreturn valve, in the heating mode, disconnects active parts of the refrigerant circuit from parts of the refrigerant circuit which are inoperative in the heating mode and, in the refrigerant recirculation mode, allows refrigerant to pass from those parts of the refrigerant circuit which are inoperative in the heating mode to those parts of the refrigerant circuit which are active in the heating mode.

When operating a corresponding air-conditioning system, the hot-gas temperature and/or the suction pressure and/or the superheating of the refrigerant downstream of the heat pump evaporator are monitored to determine the demand for refrigerant, and if a hot-gas temperature threshold value is exceeded or if the suction pressure drops below a suction pressure threshold value or if a threshold value for the superheating of the refrigerant at the outlet of the heat pump evaporator is exceeded, the refrigerant recirculation mode is initiated. It is preferable for the end of the refrigerant recirculation to be terminated after a predetermined time or after the heating power has dropped below a predetermined, minimum heating power (dependent on the outside temperature and compressor rotational speed). Furthermore, there are corresponding means for determining if too much refrigerant has sunk into the inoperative parts of the refrigerant circuit. If a corresponding state is determined, sufficient refrigerant is recirculated from the inoperative parts of the refrigerant circuit into the active parts of the refrigerant circuit to allow optimum operation to be restored.

During the refrigerant recirculation, it is preferable for an expansion valve in a part of the refrigerant circuit which is inactive in the heating mode to be closed and for the air to be switched to recirculated air mode. This increases the pressure in the evaporator and the recirculation of refrigerant is also accelerated by this measure. If this proves insufficient and the suction pressure drops to a correspondingly great extent before sufficient recirculation is achieved, it is preferable for said expansion valve to be opened again, so that the gas cooler is then also sucked empty.

When sucking empty the gas cooler in the refrigerant recirculation mode, it is preferable to switch on an associated fan in order to apply ambient air to a gas cooler which is part of the refrigerant circuit. Consequently, the gas cooler does not cool down as quickly while the refrigerant is evaporating in it, and the suction pressure remains at a higher level than without operation of the fan. Overall, the use of the fan accelerates coolant recirculation.

In the heating mode, it is preferable for the heat pump evaporator to be disconnected from the coolant circuit if the suction pressure in the refrigerant circuit exceeds an upper limit value. The fact that the limit value is exceeded indicates that the active refrigerant circuit is overfilled. In the overfilled state described, the high suction pressures may occur combined, at the same time, with high coolant temperatures during the heating mode. Disconnecting the heat exchanger causes the suction pressure to drop again, thereby preventing permissible suction pressure values from being exceeded. If the suction pressure then drops below a predetermined threshold value, the heat pump evaporator can be connected back into the coolant circuit.

Alternatively, the suction pressure can be set by means of the flow of coolant in the evaporator, and this suction pressure can be stably set to a constant value, preferably the maximum possible value, by altering the flow of coolant in the evaporator. This avoids fluctuations in the operating states which may occur with the abovementioned 2-point control. In an advantageous embodiment, the maximum flow of coolant in the evaporator corresponds to the maximum suction pressure. The flow of coolant is in this case set by a clocked valve or a proportional control valve.

BRIEF DESCRIPTION OF THE DRAWINGS

The text which follows provides a more detailed explanation of the invention on the basis of an exemplary embodiment and with reference to the drawings, in which.

DETAILED DESCRIPTION

Figure 1:
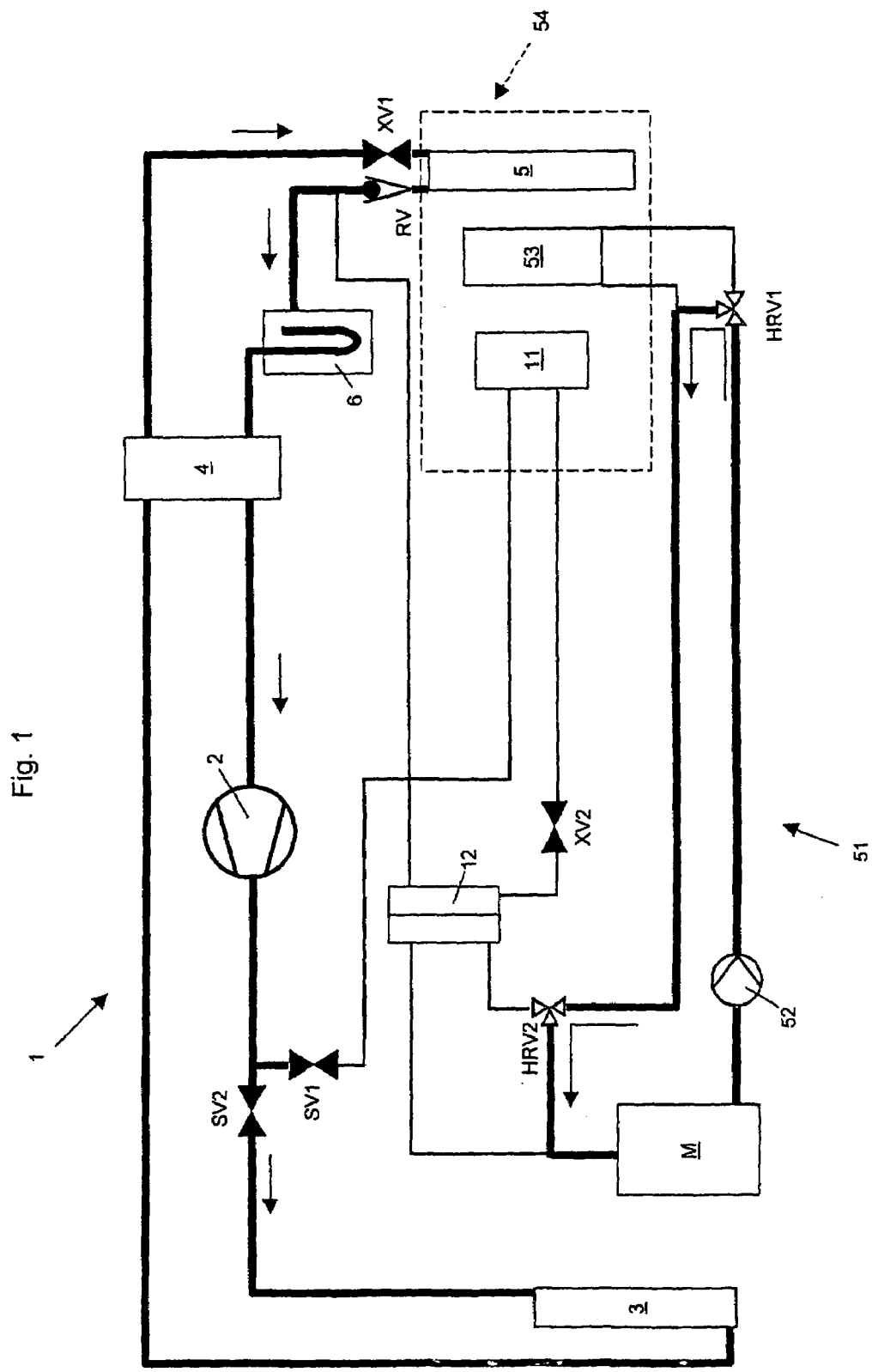
FIG. 1 shows a circuit according to the invention for an air-conditioning system in cooling mode.

FIG. 1 shows a refrigerant circuit 1 of an air-conditioning system in cooling mode, in which the active parts, i.e. the parts which are operating, of the system of lines are represented by thicker lines than the inoperative parts and the direction of flow is indicated by arrows. In the refrigerant circuit 1, the refrigerant leaves a compressor 2, is passed via an open switching valve SV2 to a gas cooler 3, where it dissipates heat to the environment. From there, it flows to an inner heat exchanger 4, where it is cooled again by exchanging heat with the compressor suction gas, i.e. with the gaseous refrigerant which is then fed back to the compressor 2. The refrigerant is expanded through an expansion valve XV1 and evaporated in an evaporator 5, with the passenger compartment feed air being cooled at the same time. The refrigerant then flows back to the compressor 2 via a nonreturn valve RV, a refrigerant collector 6 and the inner heat exchanger 4.

During this mode, only part of the refrigerant circuit 1 has refrigerant flowing through it. A heater 11, i.e. a heat exchanger which heats up the passenger compartment feed air in the heating mode, a second expansion valve XV2, a heat pump evaporator 12, i.e. a heat exchanger which in heating mode takes up the waste heat of the engine M supplied via an engine coolant circuit 51 that is likewise part of the air-conditioning system, and a switching valve SV1 are arranged in that part of the refrigerant circuit 1 through which no refrigerant is flowing, i.e. the inoperative part. The switching valve SV1 is closed in this operating state.

The engine coolant circuit 51 of the air-conditioning system is only incompletely illustrated in the figures and comprises only a heating circuit with a coolant circulation pump 52, a first coolant valve HRV1, a heating body 53, a second coolant valve HRV2, the heat pump evaporator 12 and the engine M, although the engine coolant circuit 51 may in principle be of a different construction. Further branch sections, such as the engine thermostat and the circuit leading to the radiator, are not shown.

During cooling mode, the coolant valve HRV1 is closed when the maximum refrigerant capacity is required, but may also be opened cyclically or partially if, in what is known as the reheat mode, the air, after it has been cooled (and generally dehumidified) in the evaporator 5, is then to be reheated in the heating body 53.

The heater 11, the evaporator 5 and the heating body 53 are part of an air-conditioning unit 54 (surrounded by a dashed line), which is generally arranged in a dashboard of the motor vehicle. Recirculated air or fresh air can be passed through the air-conditioning unit 54 by means of a fan (not shown); the air can be cooled in the evaporator 5 and heated by the heater 11 and the heating body 53. The air whose temperature has been controlled in the air-conditioning unit 54 can be fed to the interior compartment of the vehicle via suitable outlet members (not shown).

Since in the cooling mode the heat pump evaporator 12 is at a low system pressure and the heater 11 can likewise be placed at evaporator pressure level by the second expansion valve XV2 being opened, there is no displacement of liquid refrigerant into that part of the refrigerant circuit 1 which is not required in the cooling mode. Consequently, both the heat pump evaporator 12 and the heater 11 are at a higher temperature than the condensation temperature corresponding to the lowest system pressure.

By configuring the expansion valve XV2 as an expansion valve which can be shut off and configuring the switching valve SV1 as a switching valve which is closed when it is unenergized, it is possible to completely shut off the heater 11, which complies with current safety concepts. If the expansion valve cannot be shut off, in particular is not back-sealed, it is possible to avoid flow back through it by the addition of a nonreturn valve. If the switching valve SV1 is additionally configured in such a way that it opens backwards, it is possible to avoid the formation of an inadmissible high pressure between the switching valve SV1 and the expansion valve XV2. Alternatively, the combination of switching valve SV1 and switching valve SV2 can be formed as a 3/2-way valve, in which case the properties of SV1 being closed when unenergized and opening backwards should apply in this case too.

Figure 2:
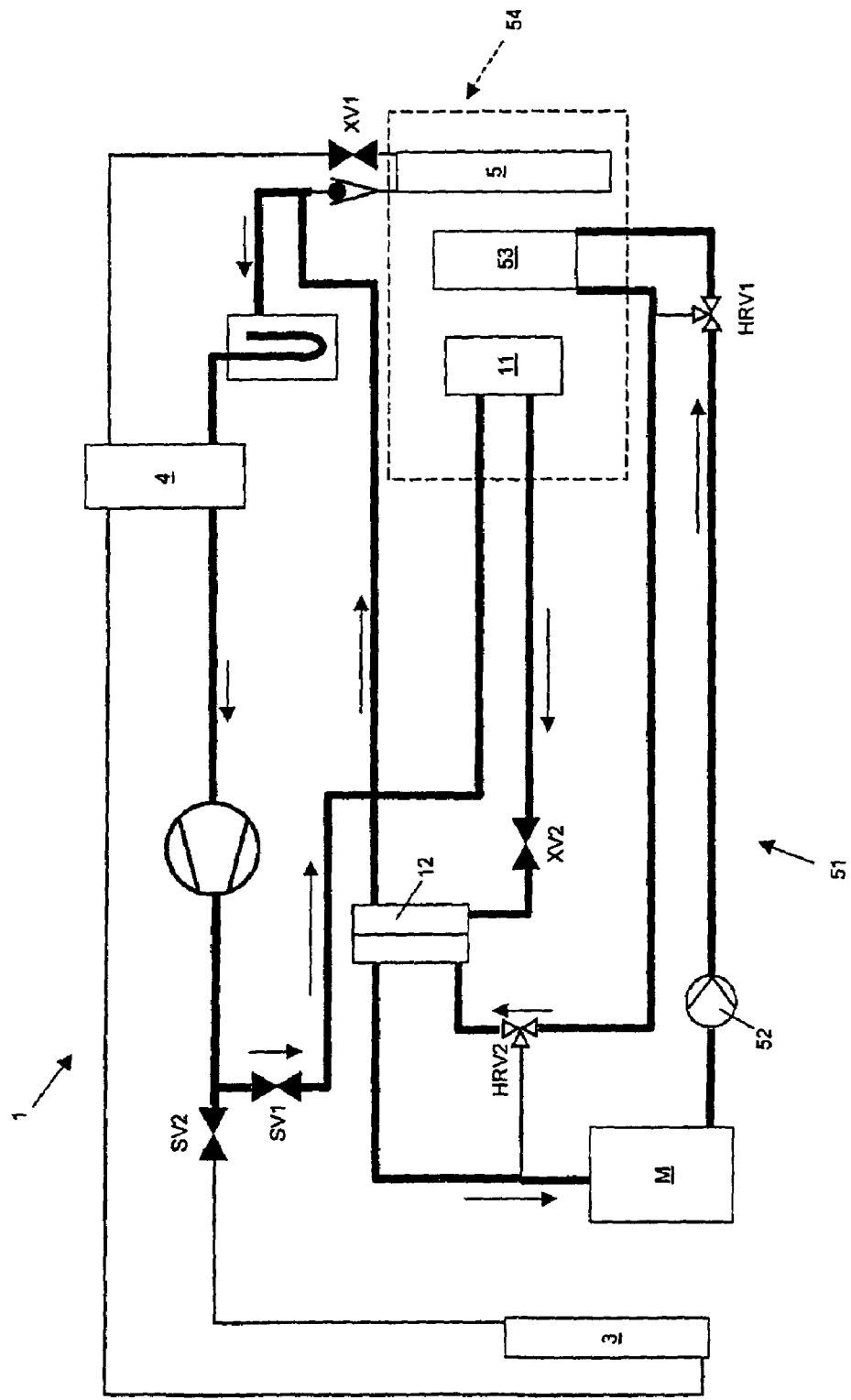
FIG. 2 shows the circuit from FIG. 1 in heating mode.

FIG. 2 shows the heating mode of the air-conditioning system. In this case, the refrigerant leaves the compressor 2 at high pressure and high temperature and is passed via the switching valve SV1, which is now open, to the heater 11, where it cools and in doing so heats the passenger compartment feed air. It is then throttled to a low system pressure in the expansion valve XV2 and evaporated in the heat pump evaporator 12, taking up heat from the coolant of the engine coolant circuit 51. For this purpose, the coolant valve HRV2 is switched so as to apply engine coolant to the heat pump evaporator 12. Depending on the operating conditions, the refrigerant may leave the heat pump evaporator 12 as wet steam (i.e. steam in phase equilibrium with a liquid fraction) or superheated to a greater or lesser extent. Superheating occurs in particular at high engine coolant temperatures. This superheating is also dependent on the quantity of refrigerant circulating in the refrigerant circuit 1, which can be used to detect a lack of refrigerant in the active part of the refrigerant circuit 1. The suction gas then flows to the collector 6, through the inner heat exchanger 4 (which has no function in this operating state) to the compressor 2.

The function of the coolant valve HRV1 depends on the current heating demand and this valve may be completely open, partially open or not open at all, depending on the particular requirements. In this circuit, the heat pump evaporator 12 is connected downstream of the heating body 53 on the engine coolant side. However, other forms of connection are also conceivable, for example upstream of the heating body or in an independent sub-circuit of the engine coolant circuit 51. It is also conceivable for it to be coupled to a heat source which is independent of the engine coolant circuit 51.

The nonreturn valve RV prevents refrigerant from passing into the cold evaporator 5 and if appropriate back through the expansion valve XV1 into the cold gas cooler 3, where it sinks down. However, this is not achieved completely, but rather the finite leaktightness of the nonreturn valve RV means that the refrigerant will flow continuously, albeit slowly, into the inoperative part of the refrigerant circuit 1 (evaporator 5 and gas cooler 3). Consequently, the refrigerant has to be sucked out from time to time. As the refrigerant content in the active part of the refrigerant circuit 1 drops, increasing superheating—compared to operation without any lack of refrigerant—occurs at the heat pump evaporator 12, and the temperature of the refrigerant at the outlet of the compressor 2 is also higher than in the states without any lack of refrigerant. Comparing this temperature with a desired temperature which is stored in a characteristic diagram and may depend on suction pressure, high pressure and coolant temperature (or only some of the abovementioned variables) makes it possible to detect the demand for refrigerant to be recirculated into the active part of the refrigerant circuit 1.

Alternatively, a lack of refrigerant in the active refrigerant circuit can be detected by the suction pressure deviating from a predetermined tolerance range or the superheating of the refrigerant downstream of the heat pump evaporator 12 deviating from a predetermined tolerance range.

The tolerance range depends on a number of parameters, mainly the temperature of the refrigerant at the inlet of the heat pump evaporator 12, but may also depend on the selected high pressure, the compressor rotational speed or the air temperature at the heater 11.

Very unsteady operating states (such as for example with a varying engine speed and therefore compressor rotational speed) may temporarily lead to conditions in the refrigerant circuit 1 which simulate a lack of refrigerant. Therefore, by suitable filtering of the data (e.g. the demand for a rotational speed which varies slightly over the course of time), it is possible to ensure that refrigerant recirculation is only initiated when sufficiently steady operating states are observed.

Figure 3:
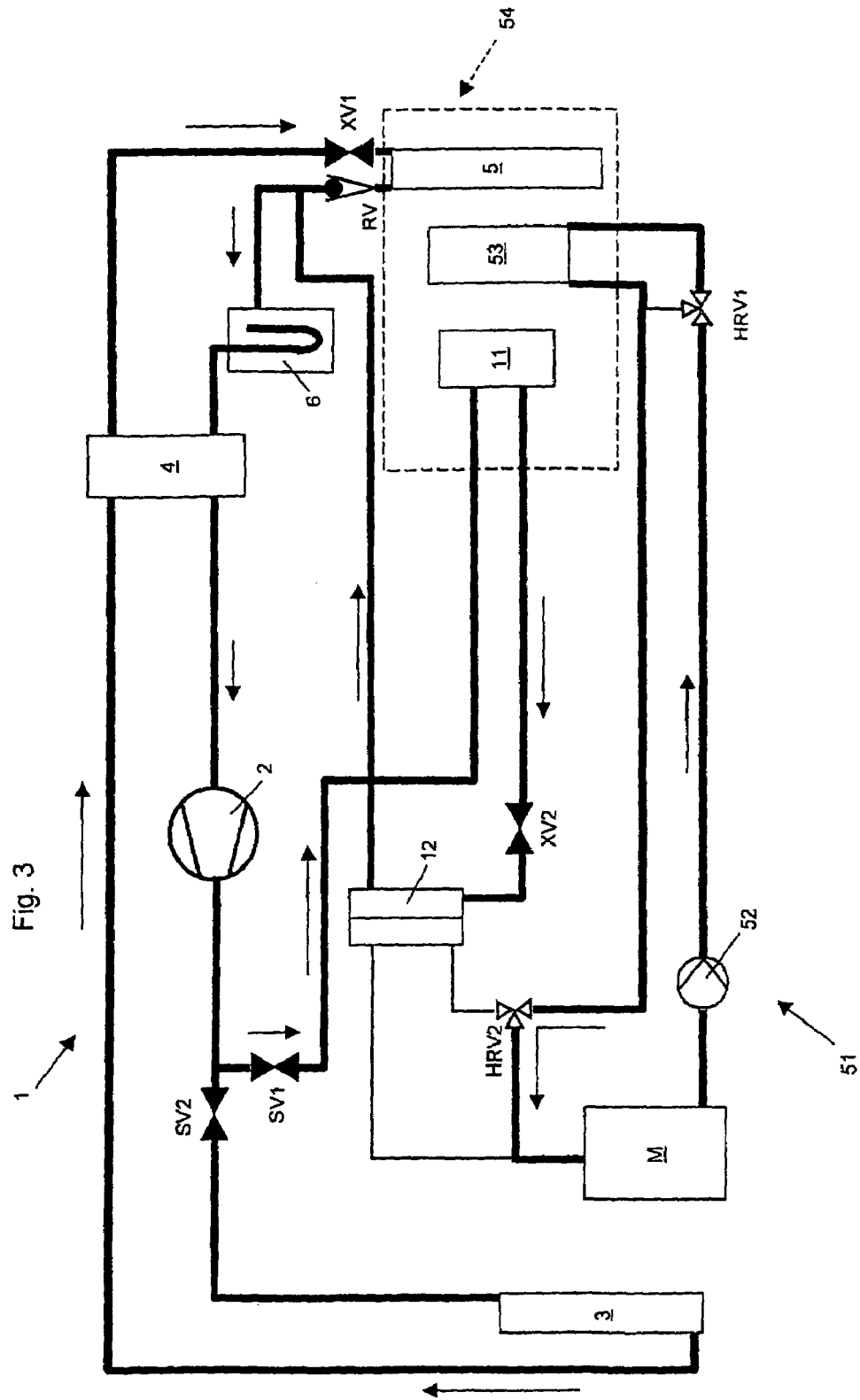
FIG. 3 shows the circuit shown in FIG. 1 during refrigerant recirculation.

The conditions used in refrigerant recirculation are illustrated in FIG. 3. In this case, as in the heating mode, the switching valve SV1 is open and the switching valve SV2 is closed. To suck the refrigerant out of that part of the refrigerant circuit 1 which is inoperative in the heating mode, the suction pressure must be reduced sufficiently for it to be lower than the pressure in the gas cooler 3 and evaporator 5, which is determined by the ambient temperature. This is achieved in the most simple way by the coolant valve HRV2 in the engine coolant circuit 51 being switched in such a way that the heat pump evaporator 12 no longer has engine coolant flowing through it. Since no more heat is being supplied, the heat pump evaporator 12 cools down and therefore the suction pressure also drops. If the suction pressure of the compressor 2 is lower than the pressure in the evaporator 5, the nonreturn valve RV opens and the evaporator 5 is emptied. If the expansion valve XV1 is additionally opened, the gas cooler 3 and the line between the gas cooler 3 and the expansion valve XV1 are also emptied.

During the suction operation, the heat pump continues to supply heating power, which drops only slowly, and consequently the users do not become aware of any interruption to the additional heating function.

The function of the coolant valve HRV1 depends on the current demand for heating, and this valve may be completely open, partially open or not open at all, depending on the particular requirements.

The end of refrigerant recirculation can be defined by a plurality of possible options:

- hot gas temperature drops below threshold value,
- suction pressure drops below threshold value (if appropriate as a function of ambient temperature and compressor rotational speed)
- termination of the refrigerant recirculation after a predetermined time
- termination of the refrigerant recirculation when the heating power drops below a predetermined, minimum heating power (dependent on outside temperature and compressor rotational speed)

LIST OF REFERENCE SYMBOLS

1 Refrigerant circuit
2 Compressor
3 Gas cooler
4 Inner heat exchanger
5 Evaporator
6 Collector
11 Heater
12 Heat pump evaporator
51 Engine coolant circuit
52 Coolant circulation pump
53 Heating body
54 Air-conditioning unit
HRV1, HRV2 Coolant valve
M Engine
RV Nonreturn valve
SV1, SV2 Switching valve
XV1, XV2 Expansion valve

The invention claimed is:

1. An air-conditioning system for a motor vehicle, comprising:
a refrigerant circuit with a plurality of heat exchangers through which a refrigerant can be passed,
wherein one of the heat exchangers is simultaneously part of a coolant circuit,
wherein the refrigerant circuit is capable of a heating mode,
wherein the refrigerant circuit comprises a first set of parts which are inoperative in the heating mode and a second set of parts which are active in the heating mode,
wherein the refrigerant circuit is configured such that refrigerant recirculation from the first set of parts into the second set of parts is provided on demand in a refrigerant recirculation mode, and
wherein the refrigerant circuit is configured to disconnect the one of the heat exchangers from inflow of coolant flowing in the coolant circuit for the refrigerant recirculation mode.

2. The air-conditioning system as claimed in claim 1, the first set of parts comprises the one of the heat exchangers and another additional heat exchanger.

3. The air-conditioning system as claimed in claim 1, wherein the coolant circuit is an engine coolant circuit.

4. The air-conditioning system as claimed in claim 1, further comprising a means for determining a demand for refrigerant.

5. The air-conditioning system as claimed in claim 4, wherein the means for determining a demand for refrigerant comprises one or more temperature sensors and/or pressure sensors.

6. The air-conditioning system as claimed in claim 4, wherein the means for determining a demand for refrigerant comprises a temperature sensor in the refrigerant circuit provided downstream of a compressor and upstream of a heater, as seen in a direction of flow of the refrigerant.

7. The air-conditioning system as claimed in claim 4, wherein the means for determining a demand for refrigerant comprises a pressure sensor in the refrigerant circuit arranged upstream of a compressor, as seen in a direction of flow of the refrigerant.

8. The air-conditioning system as claimed in claim 1, wherein the refrigerant circuit has parts through which refrigerant flows in the heating mode, and wherein the air-conditioning system further comprises a means for determining whether there is sufficient refrigerant in the parts of the refrigerant circuit through which refrigerant flows in the heating mode.

9. The air-conditioning system as claimed in claim 1, wherein a nonreturn valve is provided in the refrigerant circuit,
wherein the nonreturn valve, in the heating mode, is configured to separate the second set parts of the refrigerant circuit from the first set of parts of the refrigerant circuit, and
wherein the nonreturn valve, in the refrigerant recirculation mode, allows refrigerant to pass from the first set of parts of the refrigerant circuit to the second set of parts of the refrigerant circuit.

10. A method for operating the air-conditioning system, wherein the air-conditioning system comprises a refrigerant circuit with a plurality of heat exchangers through which a refrigerant can be passed, wherein one of the heat exchangers is simultaneously part of a coolant circuit, wherein the refrigerant circuit is capable of a heating mode, wherein the refrigerant circuit comprises a first set of parts which are inoperative in the heating mode and a second set of parts which are active in the heating mode, wherein the refrigerant circuit is configured such that refrigerant recirculation from the first set of parts into the second set of parts is provided on demand, wherein the method comprises:
determining, at least in the heating mode, a demand for refrigerant in the second set of parts; and
withdrawing refrigerant from the first set of parts to fed the second set of parts by disconnecting the one of the heat exchangers from inflow of coolant flowing in the coolant circuit.

11. The method as claimed in claim 10 wherein at least one parameter is monitored to determine the demand for refrigerant, wherein the at least one parameter is a hot-gas temperature, a suction pressure, a temperature of the refrigerant, a high pressure, a compressor rotational speed, or any combination thereof.

12. The method as claimed in claim 11, wherein a plurality of parameters are monitored for determining the demand for refrigerant,
wherein threshold values for the monitored parameters are determined, and
wherein the method further comprises detecting the monitored parameters that exceed or fall below the determined threshold values.

13. The method as claimed in claim 12, wherein the threshold values are derived from characteristic diagrams determined from the parameters to be monitored.

14. The method as claimed in claim 10, further comprising terminating the refrigerant recirculation after a predetermined time; after a heating power has dropped below a predetermined, minimum heating power; after a hot-gas temperature has dropped below a hot-gas temperature threshold value; or after a suction pressure has dropped below a suction pressure threshold value.

15. The method as claimed in claim 10, wherein an expansion valve in the first set of parts is closed and air routing in the air-conditioning system is switched to recirculated air during refrigerant recirculation.

16. The method as claimed in claim 15, wherein the expansion valve is opened again after suction pressure has dropped below a predetermined suction pressure level.

17. The method as claimed in claim 10, wherein a fan is switched on in order to apply air to a gas cooler.

18. The method as claimed in claim 10 wherein, when the one of the heat exchangers is operated in the heating mode, the one of the heat exchangers is disconnected from the coolant circuit when suction pressure exceeds an upper limit value.

19. The method as claimed in claim 18, wherein the one of the heat exchangers is connected back into the coolant circuit after the suction pressure has dropped below a second limit value.

20. The method as claimed in claim 10, wherein a constant suction pressure is set by a flow of coolant in an evaporator.

* * * * *